Feb. 12, 1935. L. A. BECKER ET AL 1,990,892
PROCESS AND MACHINE FOR THE MANUFACTURE OF CONTAINERS
FROM TRANSPARENT CELLULOSE SHEETS
Original Filed Nov. 13, 1928   13 Sheets-Sheet 5

INVENTORS.
LOGAN A. BECKER.
JOHN M. MUNSON.
BY Ely & Barrow
ATTORNEYS.

Feb. 12, 1935.   L. A. BECKER ET AL   1,990,892
PROCESS AND MACHINE FOR THE MANUFACTURE OF CONTAINERS
FROM TRANSPARENT CELLULOSE SHEETS
Original Filed Nov. 13, 1928   13 Sheets-Sheet 6
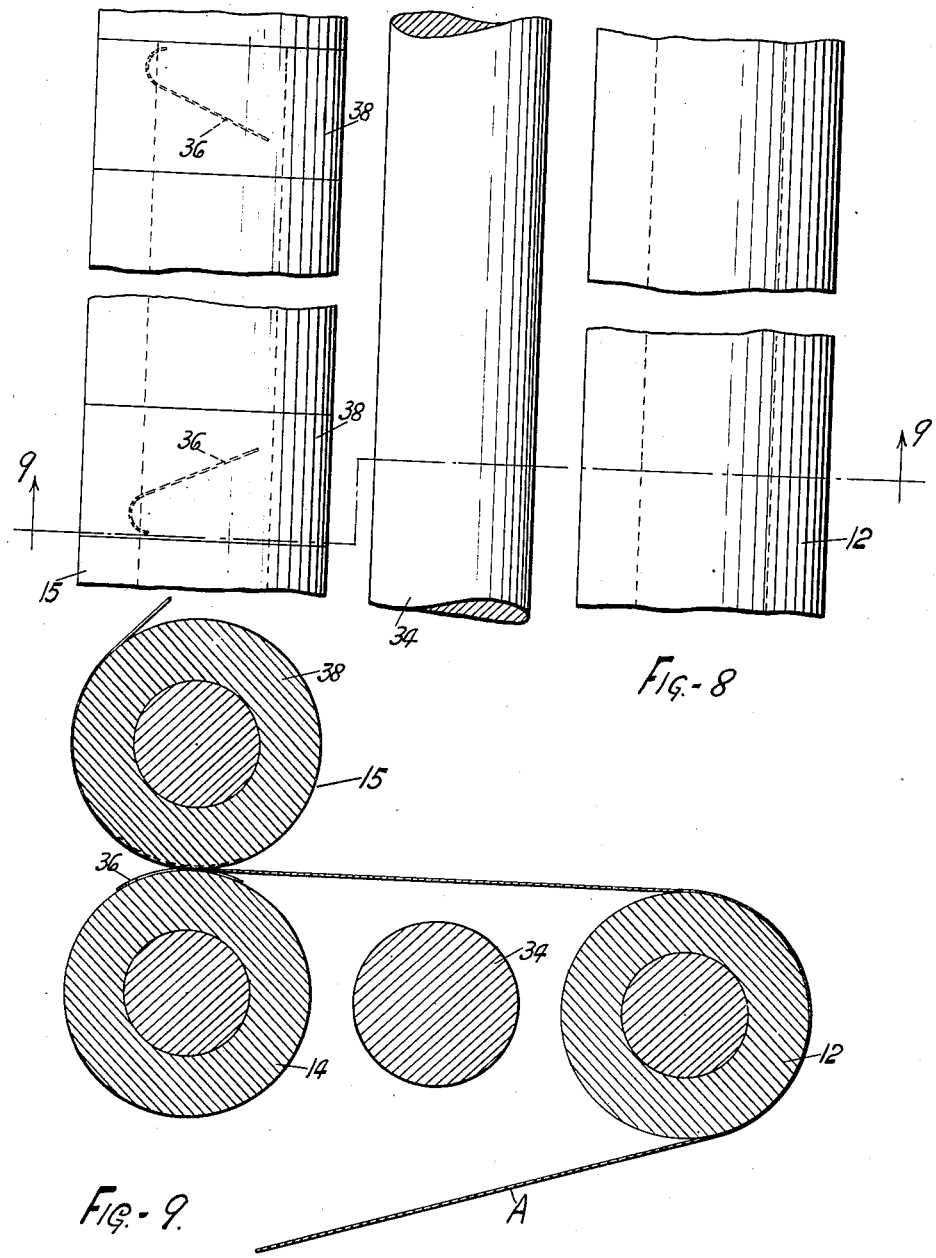
INVENTORS.
LOGAN A. BECKER.
JOHN M. MUNSON.
BY
ATTORNEYS.

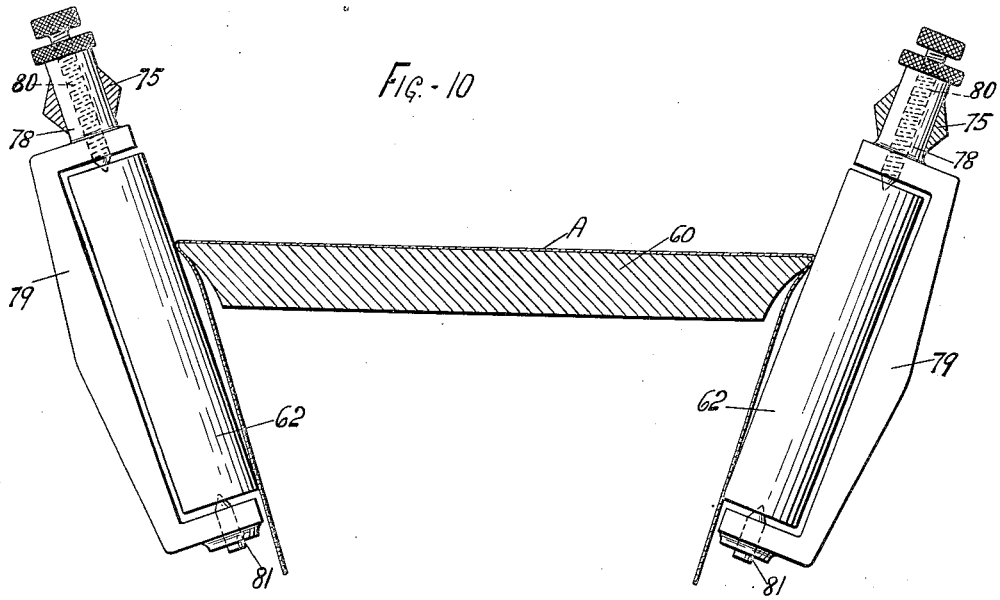
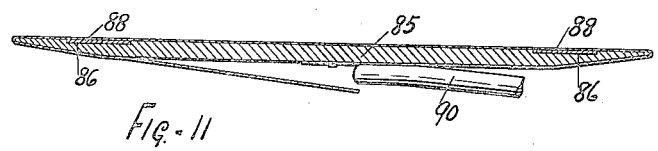
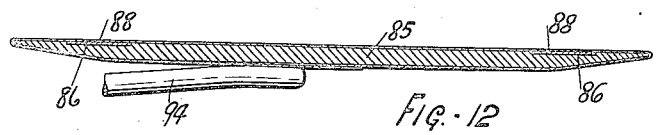
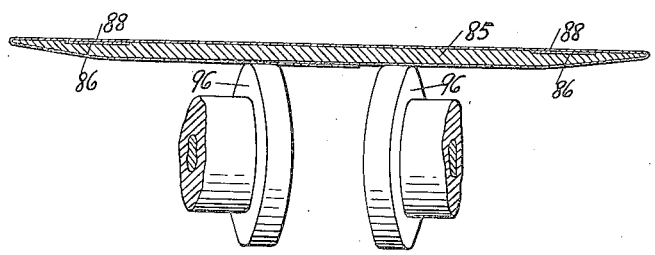

INVENTORS.
LOGAN A. BECKER.
JOHN M. MUNSON
BY
Ely H Barrow
ATTORNEYS.

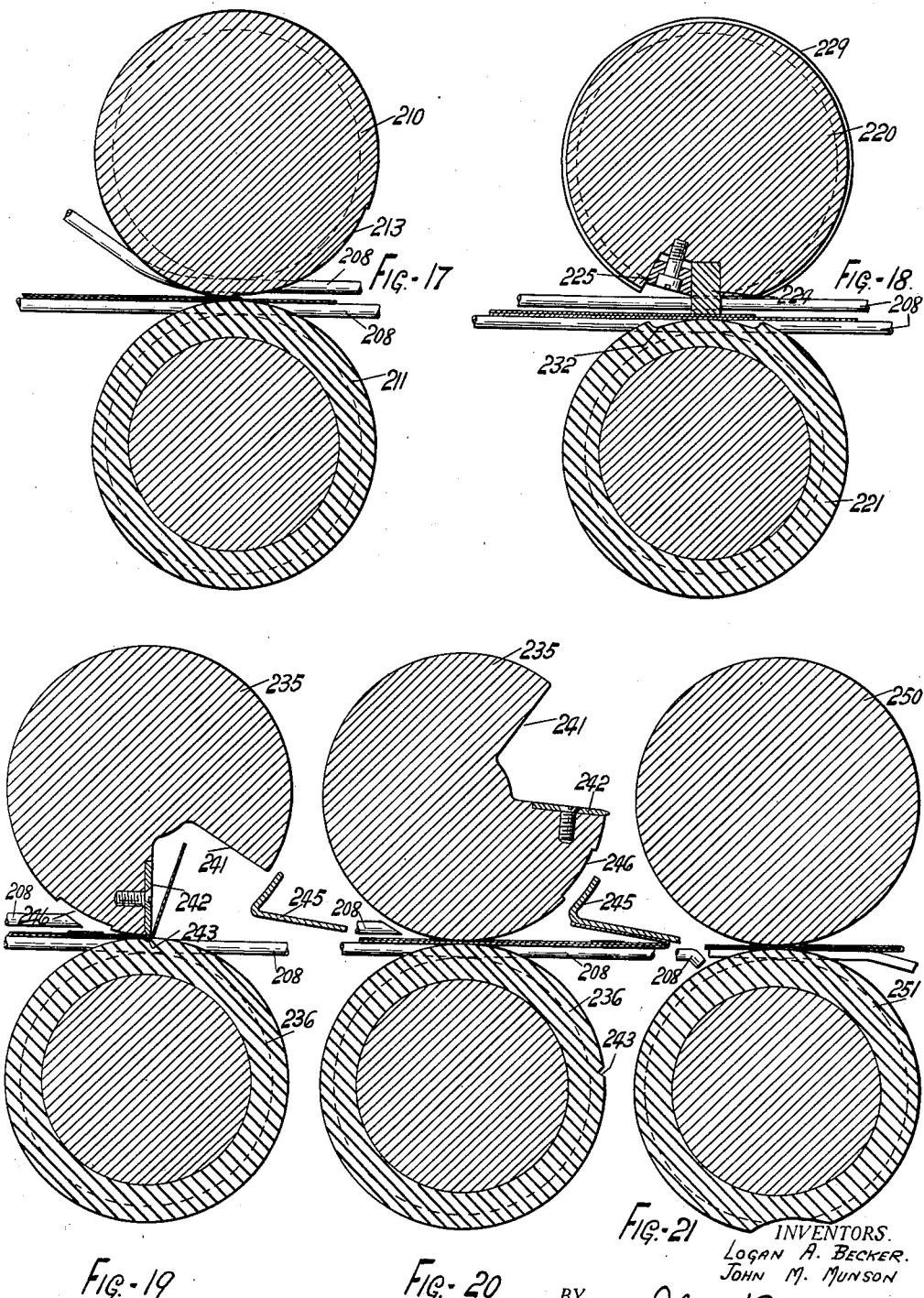

Feb. 12, 1935.  L. A. BECKER ET AL  1,990,892
PROCESS AND MACHINE FOR THE MANUFACTURE OF CONTAINERS
FROM TRANSPARENT CELLULOSE SHEETS
Original Filed Nov. 13, 1928   13 Sheets-Sheet 12

INVENTORS.
LOGAN A. BECKER.
JOHN M. MUNSON.
BY
ATTORNEYS.

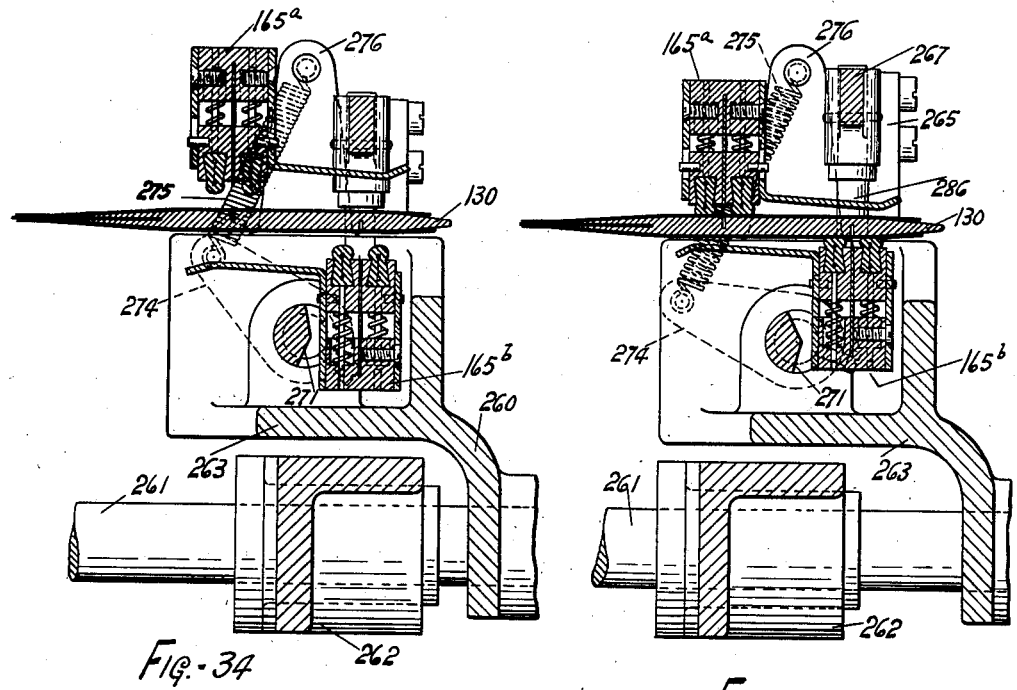
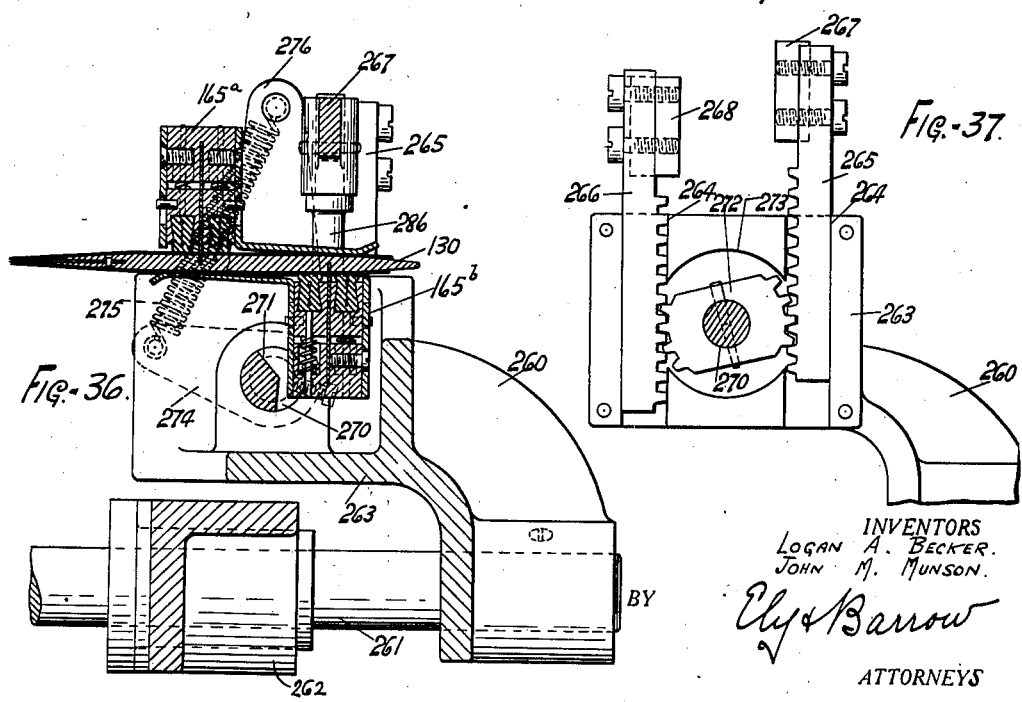

Patented Feb. 12, 1935

1,990,892

UNITED STATES PATENT OFFICE 1,990,892

PROCESS AND MACHINE FOR THE MANUFACTURE OF CONTAINERS FROM TRANSPARENT CELLULOSE SHEETS

Logan A. Becker and John M. Munson, Lakewood, Ohio, assignors to The Dobeckmun Company, Lakewood, Ohio, a corporation of Ohio Application November 13, 1928, Serial No. 319,130
Renewed November 7, 1934

24 Claims. (Cl. 93—18)

The present invention relates to the manufacture of bags or containers from webs of transparent cellulose sheeting, known in the trade as "Cellophane." The use of transparent wrappers or covers for the protection of articles of food or other merchandise has become quite extensive, and the object of the present invention is to produce a method and machine by which bags or containers of this material may be made rapidly and economically.

It has been proposed to manufacture bags or containers from this material, but the successful manufacture has heretofore been limited to the making of the bags from blanks cut from sheets. This method is unsatisfactory in many ways, due to the characteristics of the material. In addition to the difficulties arising in the cutting of blanks in quantities, the peculiar surface and texture of the sheets have made it extremely difficult to manipulate after being cut into blanks. The material is made in two distinct forms, a moisture proof and a non-moisture proof material. Owing to the texture and characteristics of the moisture proof type of sheet material, it has been impossible to manufacture bags by machine processes from this type of stock.

The present invention has for its objects and advantages that cellulose sheeting of either type can be successfully handled. The invention also has the advantage that containers or bags may be made directly from rolls of the material and the preliminary blanking of sheets and subsequent handling of the blanks is eliminated. The invention is, therefore, more efficient and economical than any prior method of manufacturing articles from this material.

It will be understood that while the invention has been described as particularly adapted for the manufacture of bags, the principles of the invention may be extended to the manufacture of other articles, such as envelopes, carton and containers or packages of all sorts. It will also be understood that the invention is not limited to the exact details shown and described herein, but may be modified or extended within the scope of the invention as defined herein.

In the consideration of the invention as described, it will be appreciated that the peculiar properties of the sheet material have made it necessary to develop entirely new principles and methods of operation. The material is light in weight and delicate in texture. While it is tough and capable of resisting strain, it is without grain and tears easily in any direction when the tear or cut has been started. The surface and transparency of the material may be injured in the manufacture of the containers and special provisions are required to prevent clouding of the material. A further difficulty in handling this material arises in cutting. Sheet cellulose can not be cut by any of the standard methods used in the cutting of paper webs or similar materials, and it is one of the objects of the invention to devise a practical and operative device by which the sheet material may be cut from the web or strip quickly and without tearing.

Other objects and advantages will be apparent from the description of the invention as set forth herein. It will be appreciated that certain features of the invention and the method and apparatus for forming the bags may be extended to the manufacture of the containers from other materials, and insofar as such features are concerned, the invention is not necessarily limited to operation upon cellulose sheeting.

The bag shown herein is the subject of a co-pending application, Serial No. 322,151, filed November 27, 1928 and issued December 1, 1931 as Patent No. 1,834,570.

The drawings represent a method and apparatus which have been successfully used in the manufacture of large quantities of bags. In these drawings:

Figure 8 is an enlarged detail plan of the preliminary slitting rolls.

Figure 9 is a section on the line 9—9 of Figure 8.

Figure 10 is an enlarged detail of the first folding or tubing operation, the section being taken on the line 10—10 of Figure 4.

Figure 11 is an enlarged detail of the second tubing operation on the line 11—11 of Figure 4.

Figure 12 is a similar view of the third tubing operation on the line 12—12 of Figure 4.

Figure 13 is a detail of the final tubing operation showing the devices for drawing the sheet about the mandrel or former, the section being taken on the line 13—13 of Figure 4.

Figure 17 is a detail of the separating rollers which operate directly after the cutters or knives.

Figure 18 is a detail of the transverse gumming rolls for the securing of the turned-over flap or tab at the bottom of the bag.

Figure 19 is a detail of the creasing or crimping rolls for turning up the flap.

Figure 20 is a detail of the turning device for turning the flap.

Figure 21 is a detail of the roller for sealing the flap.

Figures 22 to 31, inclusive, show the successive operations upon the material, from the initial slitting to the completion of the bag.

Figure 32:
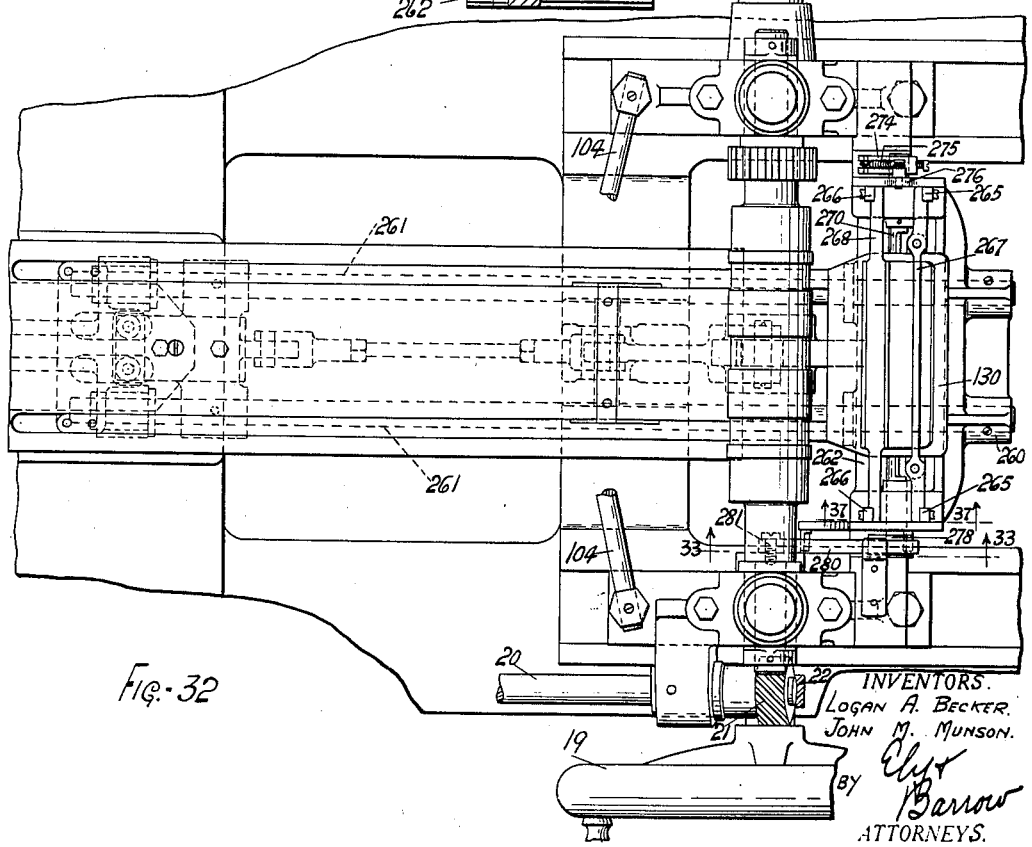

Figure 32 shows a plan of a modified form of cutter.

Figure 33:
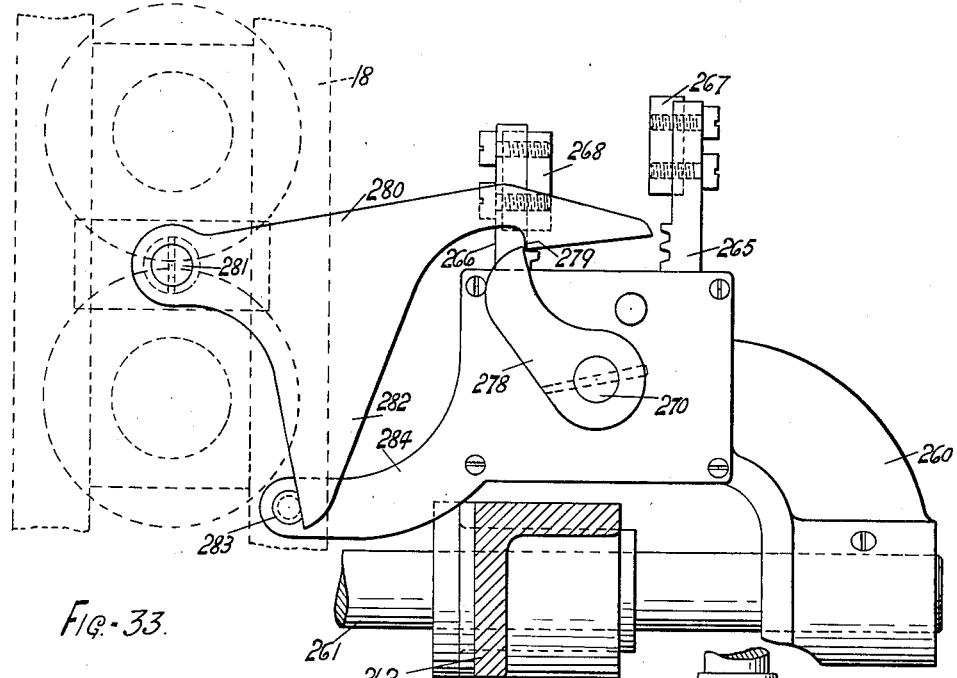

Figure 33 is an enlarged detail on the line 33—33 of Figure 32.

Figure 34 is a sectional view of the modified cutter in raised or cleared position.

Figure 35 shows the cutters or knives about to enter the sheet.

Figure 36 shows the cutters in operation.

Figure 37 is a detail on the line 37—37 of Figure 32.

In order to describe more clearly the construction and operation of the machine, the successive steps in the operation of the machine will be described and then each element or portion of the machine will be given in detail.

The sheet material A, which is sheet cellulose, although, as explained, other materials may be operated upon in this machine, is received in a roll 1. From the roll 1, the material is first conducted through the preliminary slitter or cutter rolls which cut two short, usually diagonally arranged cuts or slits in the sheet material. These cuts or slits are indicated at B in Figures 22 and 23 and are located on either side of the center line of the sheet or web and form the lateral edges or boundaries of the flaps or tabs on the bag. Attention is particularly directed to the location and formation of these slits, for it is due partially to the conception of this form of slit that the bag forming operation is successful.

The slits are shown as extending for short distances diagonally of the web and the subsequent longitudinal folds intersect the slits at some point between the ends thereof. This obviates the folding of the web material coincident with the slit which eliminates the tendency of the material to tear at the corners. This is important in manufacturing bags or containers from the particular material with which we are dealing. It also operates to form a tight, sift-proof seal at the corners of the completed bag and, for these reasons, this feature may be useful in the formation of the bags from other materials. The invention is not necessarily limited to a straight cut or to a diagonal cut, as any form of cut or slit which can be subsequently intersected by the fold may be employed. This feature is also valuable as it permits the subsequent transverse cuts to sever the blanks from the web without requiring the knives for this purpose to extend to the edges of the blank, and thereby permits the cutting against an interior cutter block as will be explained.

Attention is also directed to the radius or curve C at the forward end of each slit, which gives the slit the general formation of a fishhook or letter J. In the finished bag, at the open end thereof, the radius or bay like recess is found at the angle at the mouth of the bag. Were the slit to end abruptly, and without this or a similar formation, the bag would easily be torn at this point. By providing the extension of the cut and thus avoiding a sharp corner at this point, the material does not tear easily when the mouth of the bag is stretched open to receive the contents thereof. In fact, it is possible to handle the bag roughly without causing a tear to start at the corners. The reentrant bay like formation also obviates the necessity of accurate register between the transverse cuts and the ends of the slit, thus making rapid production possible without danger of forming a notch or starting a tear in the mouth of the finished bag.

Figure 27:
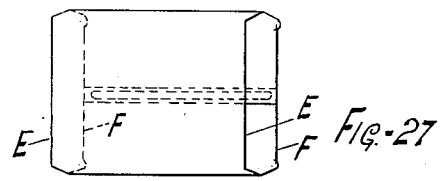
Figure 23:
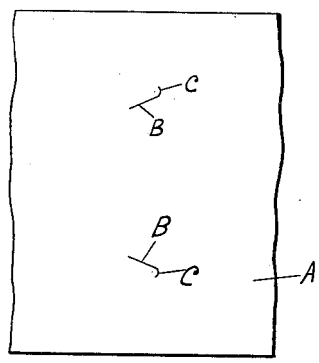
Figure 24:
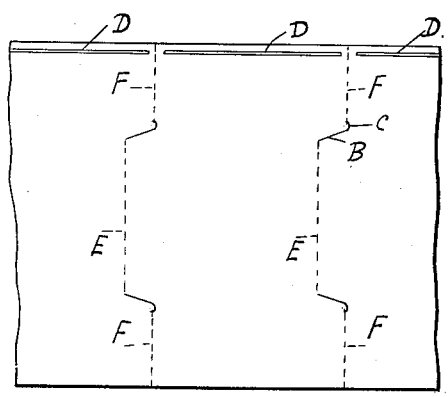
Figure 30:
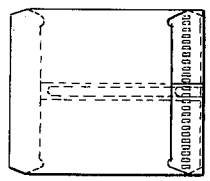
Figure 31:
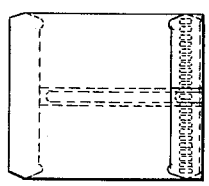
Figure 25:
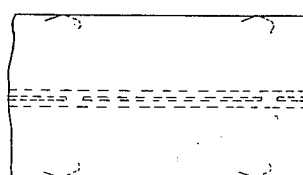
Figure 26:
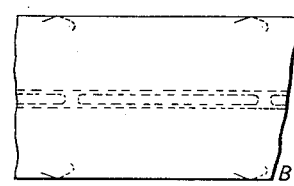

The next operation is the application of the gum strips D along one edge of the web to form the longitudinal seal (Figure 24). The web or sheet is then folded longitudinally to form the tube which is drawn tightly over the former, the folds intersecting the cuts B as described (Figures 25 and 26). The web is then cut transversely at E on the upper side of the tube and at F on the lower side of the tube, the cut F intersecting the ends of the hook portion of the slit (Figure 27).

Figure 28:
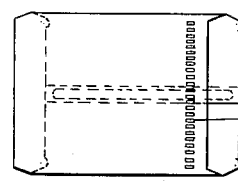
Figure 29:
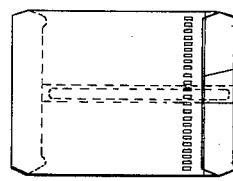

The upper surface of the blank is then gummed with a band of adhesive G which is applied, as shown in Figure 28, in a series of spots or in bars across the top of the bag. The forward flap, or that to be turned over, is creased at H (Figure 29) and the flap turned over and rolled in place (Figures 30 and 31), which completes the formation of the bag, so that it is discharged from the machine as a fully completed retainer.

The series of steps are performed automatically and in timed relation to one another, so that the completed bags are delivered rapidly and economically from a roll of the material. The bags are made with equal facility from moisture proof and non-moisture proof sheets without waste. The several steps as described may be used in the manufacture of all standard or special bags, such bags being designated in the trade as self-opening bags, side ply bags with square bottoms or pinch bottoms, satchel bottom bags or any other type of bag.

The method consists in forming a bag, container, envelope or the like from a continuous web of cellulose sheeting, slitting the web with oppositely placed and oppositely positioned, preliminary, diagonal slits, or slits cut in any suitable manner, so that the ends of the slits are at different distances from the center of the web. The web is then folded longitudinally to form a tube, the folds intersecting the slits so as to bring portions of the slits on opposite sides of the tube. The tube is then cut transversely connecting the ends of the slits and the bag is completed by folding over one of the tabs. The requisite gumming operations are performed at the proper times and in proper sequence.

The several steps described may be altered or varied. Certain of them may be omitted if found desirable and other changes and modifications may be made in the process.

Having described briefly the process as carried out in the machine, the details of the machine will now be described in full.

*Feeding, preliminary slitting and edge gumming*

Figure 1:
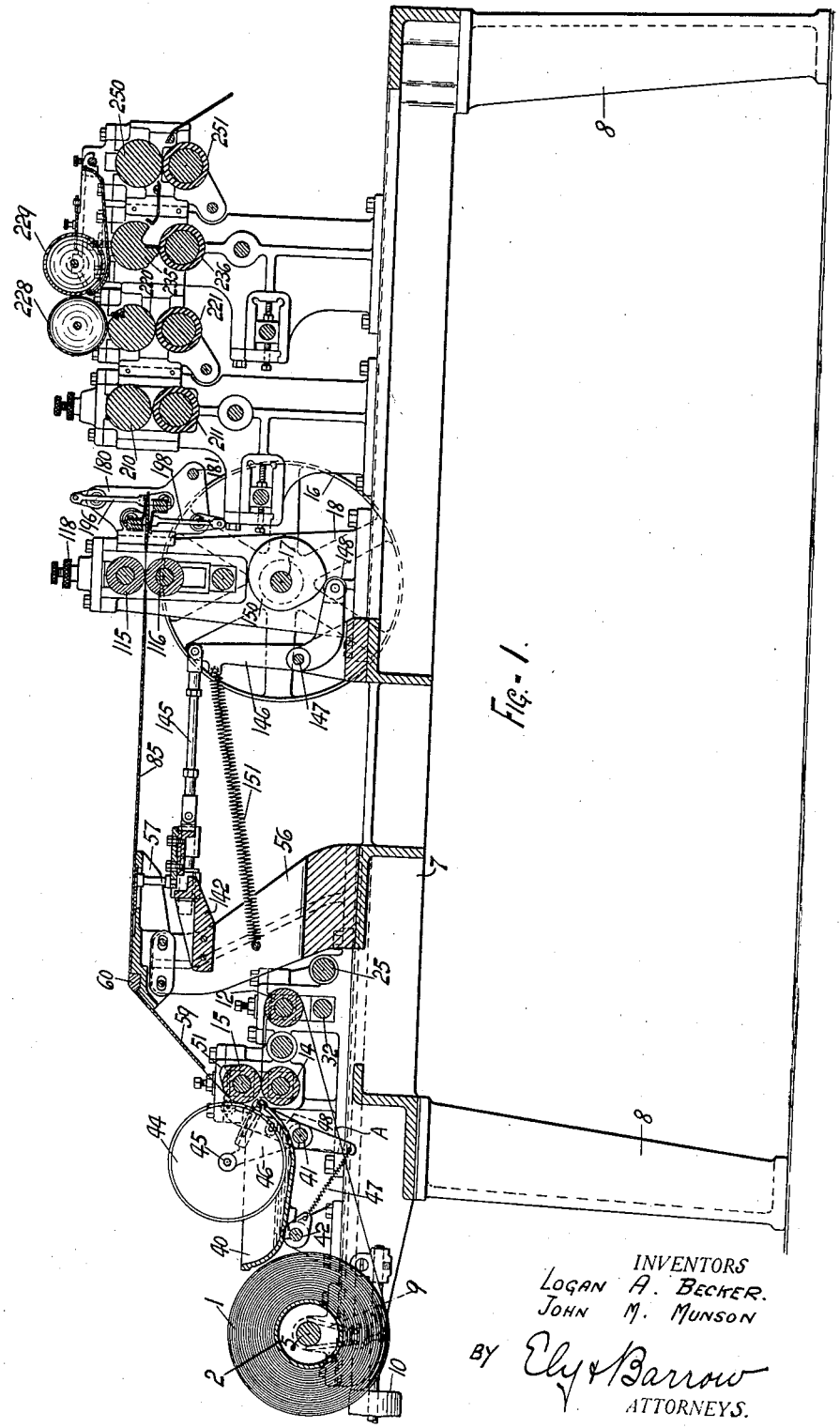
Figure 1 is a longitudinal vertical section through a complete machine constructed to manufacture bags directly from rolls of cellulose sheeting.
Figure 2:
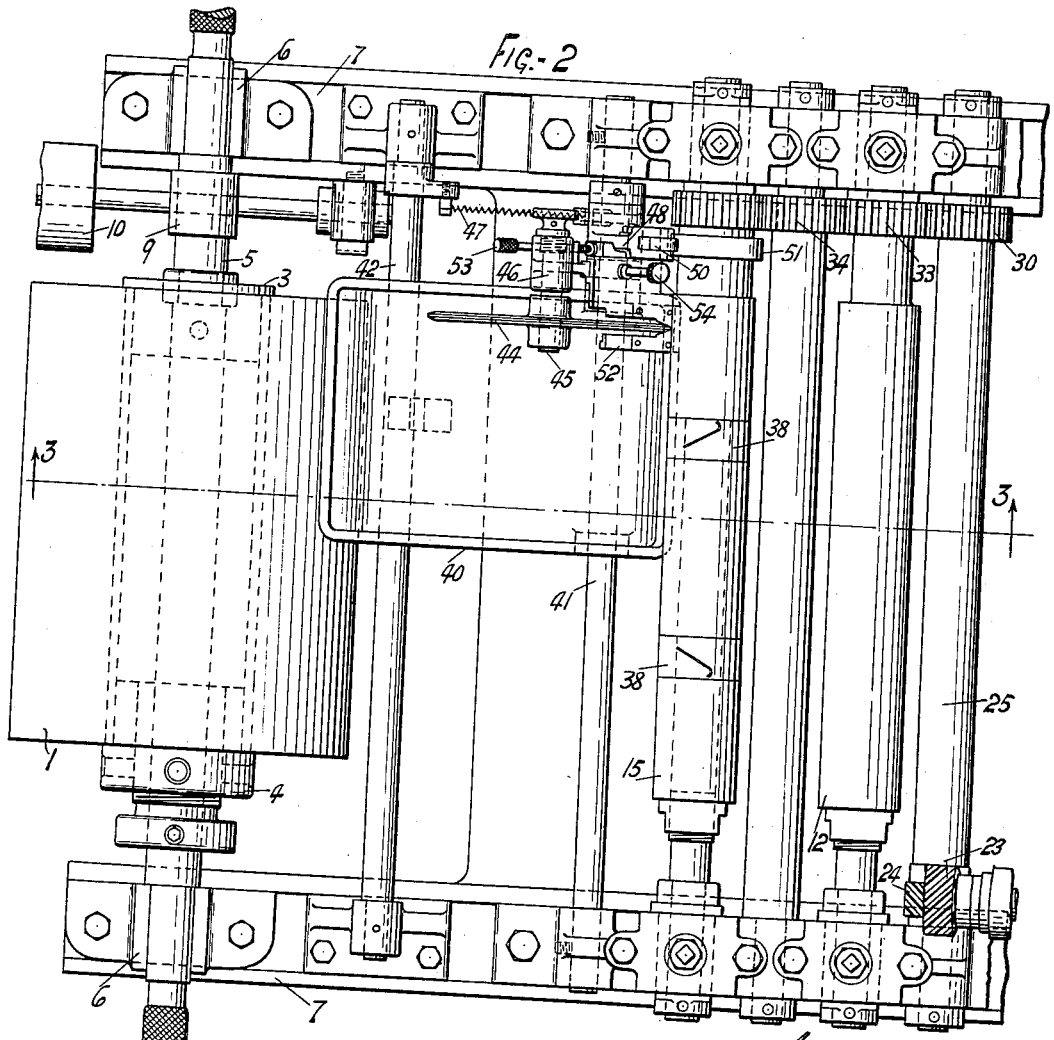
Figure 2 is a plan, on an enlarged scale, of the feeding end of the machine, showing the preliminary cutting and the preliminary gumming operations.
Figure 3:
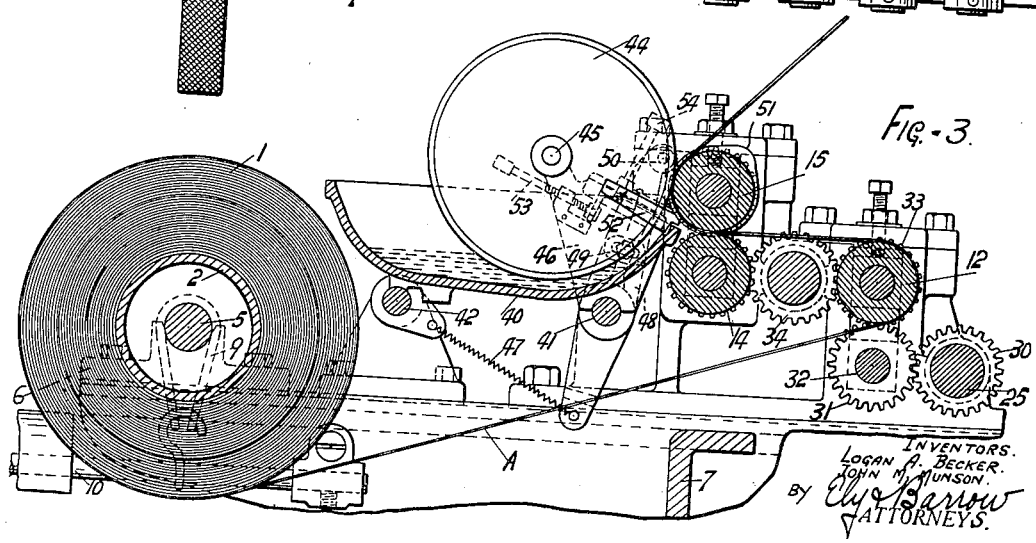
Figure 3 is a section on the line 3—3 of Figure 2.

These operations are performed at the extreme left of the machine, as shown in Figure 1, and detailed reference is made to Figures 2, 3, 8 and 9.

The cellulose sheeting is received in rolls 1 which are usually mounted on cardboard tubes 2. These tubes are fitted over chucks 3 and 4 mounted on a shaft 5. One of the chucks, here shown as 4, is adjustable to accommodate the machine to various widths of web. The shaft 5 rests in bearings 6 secured to the extreme left hand end of frame 7, which latter is supported on legs 8.

A light brake 9 having a weight 10 may be applied to the shaft 5 to prevent overrunning of the roll.

The web A passes from the roll 1 around a guide roll 12 and then between the preliminary cutting or slitting rolls 14 and 15. These rolls are driven at the same speed, as will be described, and the circumference of the rolls 14 and 15 is equal to the length of a single bag.

Figure 4:
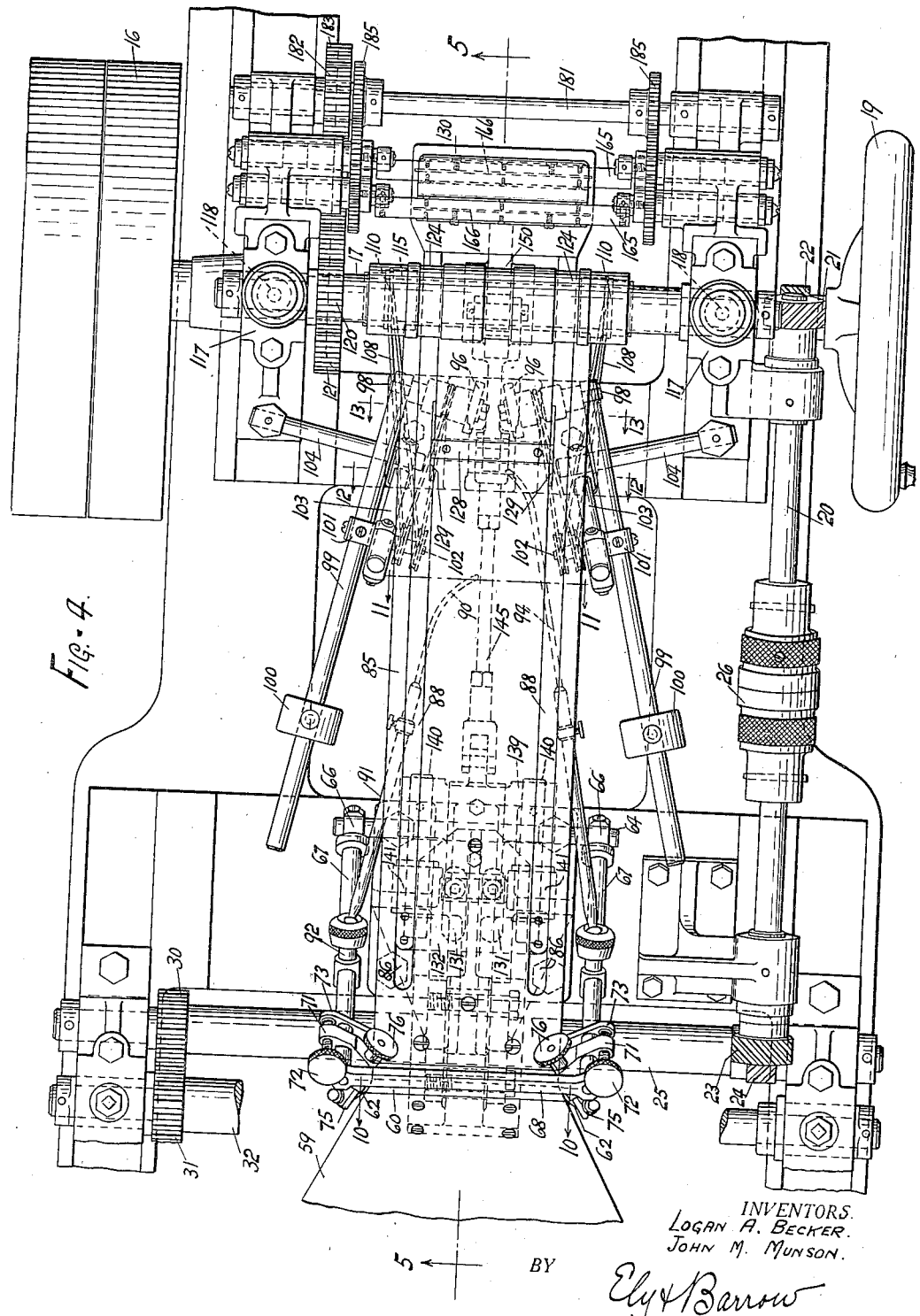
Figure 4 is an enlarged plan of that portion of the machine showing the longitudinal folding or tubing operation and the transverse cutting operation.

The machine is driven from any source of power by a drive pulley 16, the shaft 17 of which is mounted in a standard 18 supported on the frame and is provided with a hand wheel 19 for manual operation, if desired. Power is transmitted from the main shaft 17 to the rolls 12, 14 and 15 by a shaft 20 which carries a spiral gear 21 meshing with a spiral gear 22 on the shaft 17. The opposite end of the shaft is provided with a spiral gear 23 which meshes with a spiral gear 24 on the drive shaft 25 for the slitting rolls. For the purpose of synchronizing the operation of this unit with the balance of the machine, the shaft 20 may be divided and connected by an adjustable coupling 26 (Figure 4).

The shaft 25 carries, at the end opposite the spiral gears 23 and 24, a pinion 30 which meshes with a pinion 31 on an idler shaft 32. The pinion 31 meshes with a pinion 33 on the roll 12 and through an idler shaft and gear 34, the two intermeshing, slitting rolls 14 and 15 are driven.

The slitting rollers cut the slits B—C in the web of material, and for this purpose the roll 14 is provided with two thin blades 36 and that portion of the roll 15 cooperating therewith is provided with fibre or Babbitt sleeves 38 in which the blades are received.

As the web passes around the roll 15, it receives a narrow strip of gum D along one edge, the strip of gum being interrupted opposite the line of the cut F, as shown in Figure 24, leaving a slight, ungummed clearance at the ends of each blank.

The gum is supplied from a glue pot 40 located at one side of the machine and supported upon transverse shafts 41 and 42 mounted in the frame of the machine. The gum is applied by a thin edged disk 44 which is mounted upon a shaft 45 mounted upon a lever 46 and projecting over the pot so that the roller lifts the gum and applies it to the web.

Forward movement of the lever is limited by contact of the roller 44 with the surface of the material on the roll 15. In order to form the gaps between the strips of glue, the roller 44 is lifted momentarily on each revolution of the roller 15. To provide for this and to permit an adjustment of the length of the gap, a supplemental arm 48 is carried upon the lever 46, being secured for angular adjustment with relation to said arm by a slot and set screw 49. The upper end of the arm 48 carries a roller 50 which is located within the path of a cam 51 on the roller 15. The lever 48, together with the lever 46, is yieldingly held so that the roller contacts the cam, by a spring 47 connected to the lever 48 and to the shaft 42. By adjustment of the arm 48, the period of contact between the roller 50 and the cam 51 may be varied, with consequential variations in the gap between the gum strips.

An adjustable scraper 52 is slidably mounted on the upper side of the lever 46 and projects over the pot and being provided with a slot to receive the edge of the gum disk. The scraper is adjusted toward and from the roller by a set screw 53 and is held in position by a set screw 54.

It will be observed that the parts which have been described will change the condition of the web to that shown in Figure 24 and will deliver this web to the next group of devices which is the folding or tubing unit.

*Folding or tubing unit*

Figure 5:
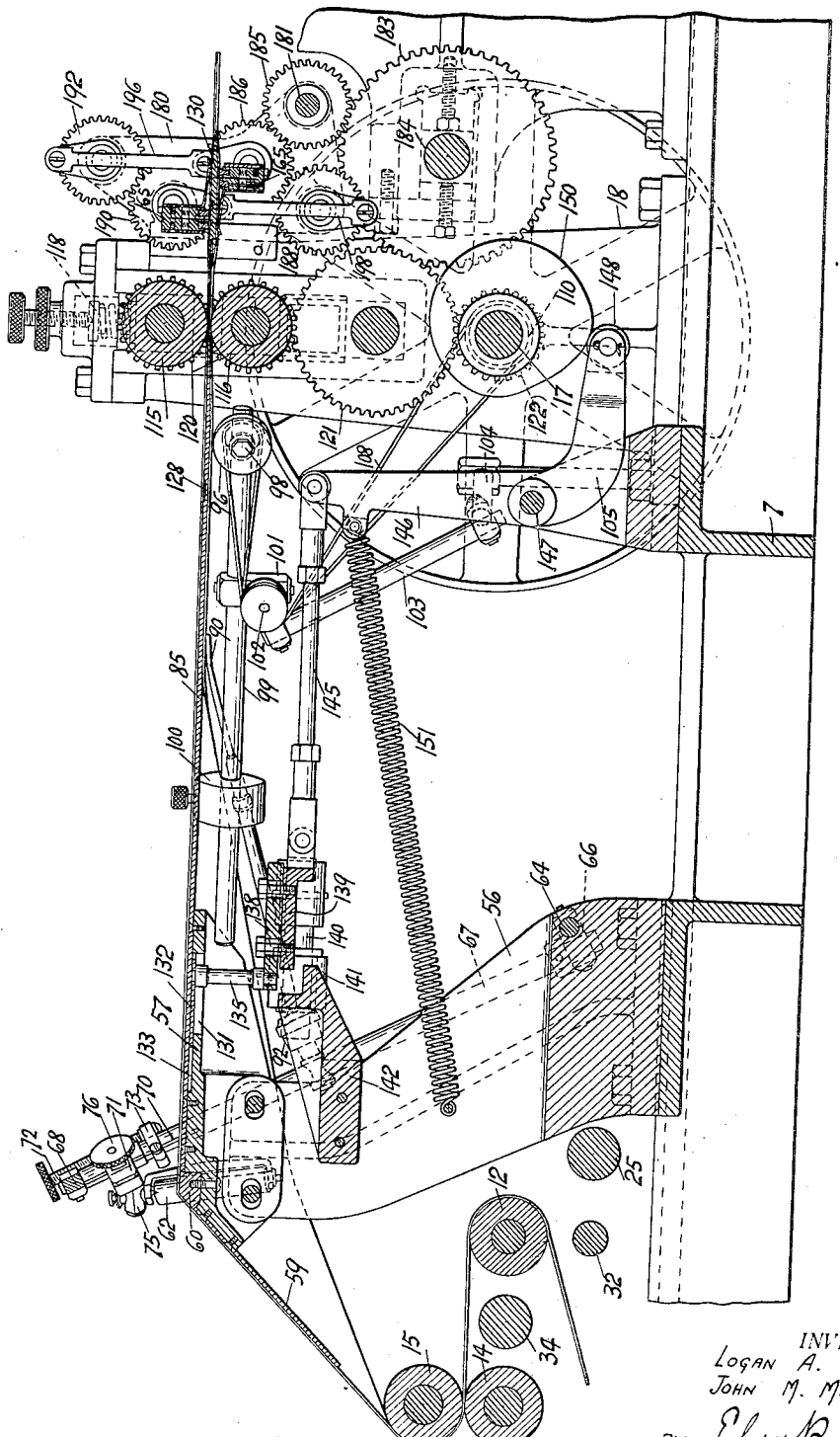
Figure 5 is a section on the line 5—5 of Figure 4.
Figure 6:
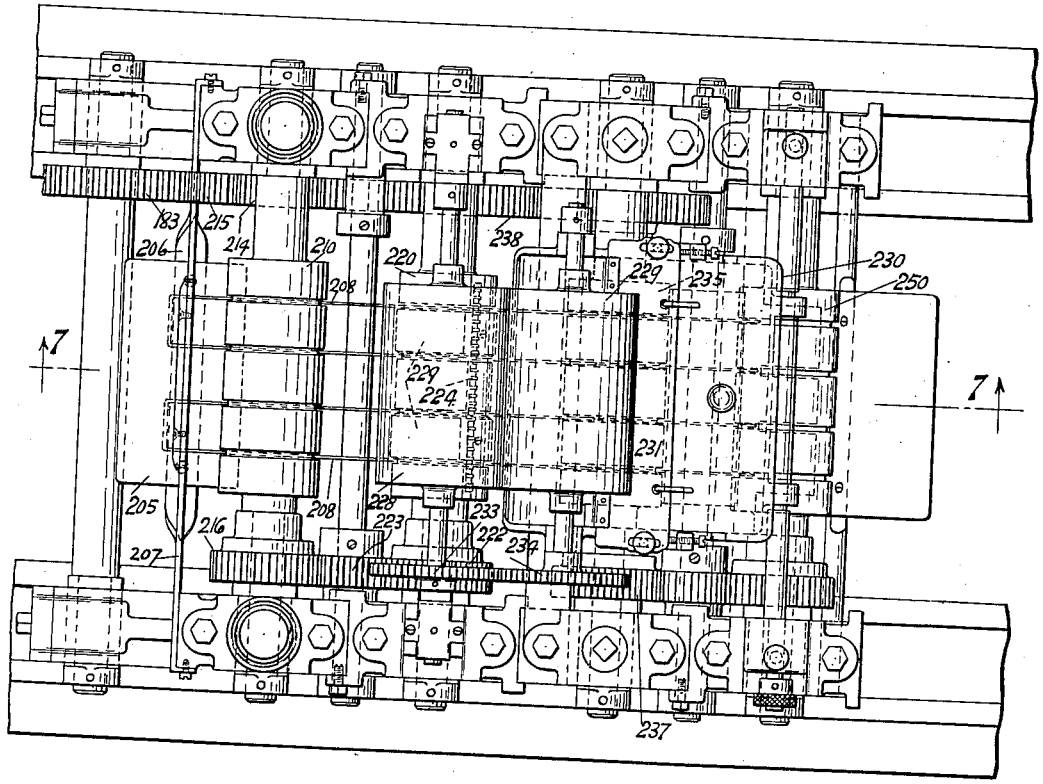
Figure 6 is a plan of the end gumming, folding and discharge mechanisms.
Figure 7:
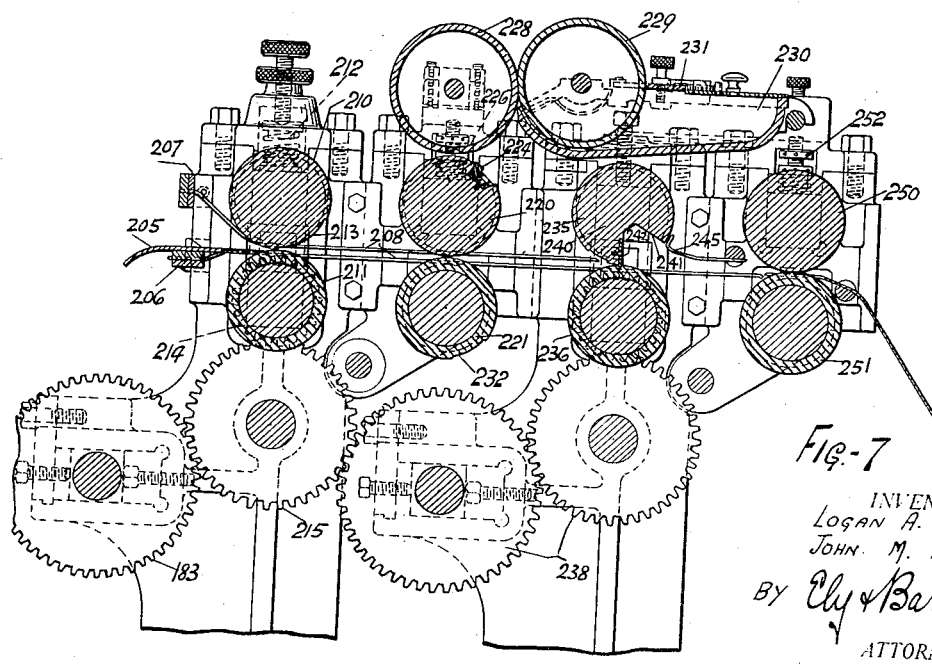
Figure 7 is a section on the line 7—7 of Figure 6.

This mechanism is shown in Figures 4 and 5 and in detail in Figures 10 to 13 inclusive.

Fixed to the machine is a bracket 56, on the upper end of which is mounted a longitudinally adjustable plate 57, the rear end of which carries a downwardly inclined metal plate 59 which extends toward the roller 15 and flares outwardly to accommodate the fold in the material. In the angle of the plate is secured a folding or breaking shoe 60 over which the material bends and on the ends of which the folding operation is initiated. The longitudinal folding operation is initiated by rollers 62 which are mounted at outwardly flaring angles as shown in Figure 10.

The rollers 62 are mounted upon the machine so as to be capable of a large range of adjustment as found necessary in treating the material in hand. A shaft 64 is provided in the base of the bracket 56 to which are secured for adjustable angular movement collars 66. Projecting through the collars and adjustable longitudinally thereof are rods 67 which extend upwardly toward the shoe 60. The upper ends of the rods are connected by a cross piece 68. The upper ends of the rods 67 are formed with keyways 70 and located on the rods and guided in the keyways are collars 71. The collars are adjusted upon the rods by screws 72, the lower ends of which are received in brackets 73 attached to the rods 67. By this means the rollers 62 may be moved bodily along the rods 67. The collars 71 are provided with clamps 75 which project through the collars and are provided with nuts 76 to hold them in place. The heads of the clamps 75 are provided with openings in which are received shanks 78 formed on yokes 79 which embrace the rollers 62, the latter being supported upon pins 80 and 81 mounted in the yokes, the pins 80 being adjustable to regulate the rotation of the roll 62.

It will be observed that the position of the rolls 62 may be adjusted to any desired angle to secure the proper longitudinal folding of the material.

From the rollers 62 the material passes over a mandrel or former 85. This is a thin plate of metal which extends from the plate 57 to the final smoothing and folding rollers. The mandrel or former is shaped, as shown in Figures 11 and 13, with flat, upper and lower surfaces connected by beveled surfaces on the under side of the former. In the upper surface of the former are cut shallow grooves or guideways 86 in which are slidable thin strips of metal 88 which support the cutter block, to be described later.

The edge portions of the web are folded under the former to complete the tube, the gum bearing edge being folded first by means of a curved finger 90 which is adjustably mounted in the end of a tube 91. The tube 91 is provided with a ball-shaped head which is clamped in position in a socket 92 carried on the rod 67 on the side of the machine on which the glue pot 40 is mounted. The other edge of the web is then folded over by a somewhat longer finger 94 mounted in a similar manner on the other rod 67.

The web is drawn tightly about the former by means of two angularly positioned tucker rollers 96. These rollers are formed of rubber and are so positioned and so rotated as to draw the material tightly around the former. These rollers are formed of rubber, with enlarged operating flanges which bear against the stock. They are rotatively mounted upon pins 98 secured in the ends of rods 99, the free ends of the rods carrying adjustable weights 100. The rods are carried in blocks 101 which are rotatably mounted on shafts 102 supported on the upper ends of upwardly inclined shafts 103 which are in turn supported upon adjustable arms 104. The arms 104 are carried upon posts 105 extending from the base of the machine. The rollers 96 are driven by a belt 108 extending around the shanks of the pulleys around idlers at the upper end of the rods 103 and around pulleys 110 on the main shaft 17. By the mechanism which has been described the tucking rollers are urged against the surface of the material and are constantly overdriven so as to draw the material tightly around the former.

The final sealing of the longitudinal fold is performed by two pressure rollers 115 and 116 which are mounted in brackets 117 located above the drive shaft 17, the roller 115 being pressed against the roller 116 by adjustable spring pressure means 118. These rollers also act as drawing rollers, serving to draw the web of material through the machine. The rollers are geared together at 120 and are driven through an idler gear 121 from a pinion 122 on the main drive shaft 17. The rollers 115 and 116 are rubber covered, the surface of the rollers being provided with grooves 124 to receive the forwardly extending ends of the slide bars 88 which extend beyond the former.

The mechanism which has been described serves to fold the web longitudinally about the former and to seal the web into tubular form. It is now ready to be cut.

*Cutting mechanism*

The cutting operation is performed upon a cutter block 130, which is carried upon the extending ends of the slide bars 88 beyond the drawing rolls. It will be observed that as the sheet or web is moving continuously, it is necessary to move the cutter block with the web during the cutting operation, the grooves in the drawing rolls permitting the slide bars to move through the drawing rolls.

In order to perform the operation of moving the cutter head, the slides 88 are extended to the rear of the former at a point prior to the folding over the edges of the web. A thin plate 128 fastened to the upper surface of the former and extending over beveled surfaces 129 in the slides 88 serves to hold the slides down upon the former. At the rear of the former the grooves 86 communicate with slots 131 and through these slots the slides are connected to a cross piece 132 which slides in a recess 133 in the upper side of the plate 57. The pillars 135 are mounted in a plate 138 which is adjustably secured to a cross head 139 secured to pins 140 beneath the former and slidably mounted in sleeves 141 carried upon a bracket 142 secured to the bracket 56.

The forward end of the cross head is connected by an adjustable link 145 to the upper end of a lever 146 pivoted to the frame at 147. The lower end of the lever carries a roller 148 which bears against a cam 150 on the main shaft 17. A spring 151 urges the roller against the cam.

By the mechanism just described the cutter block is reciprocated during the operation of the machine, the forward movement of the block taking place during the cutting operation in synchronism therewith and at the same speed of advance as the material.

Figure 14:
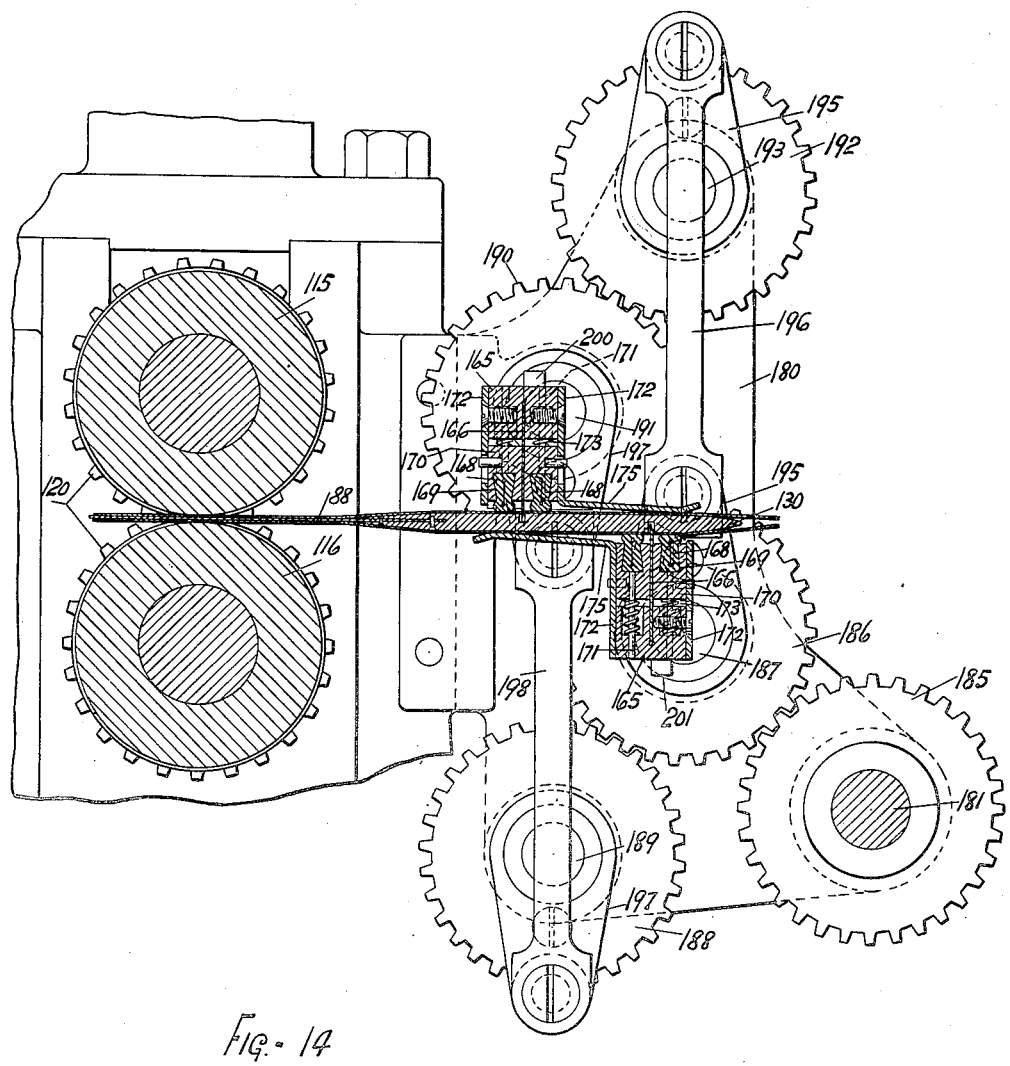
Figure 14 is an enlarged section and shows the transverse cutters in cutting position.
Figure 16:
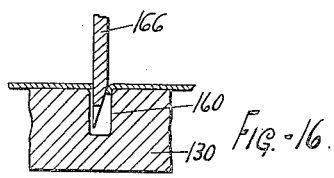
Figure 16 is a detail showing the cutter entering the sheet of cellulose.
Figure 15:
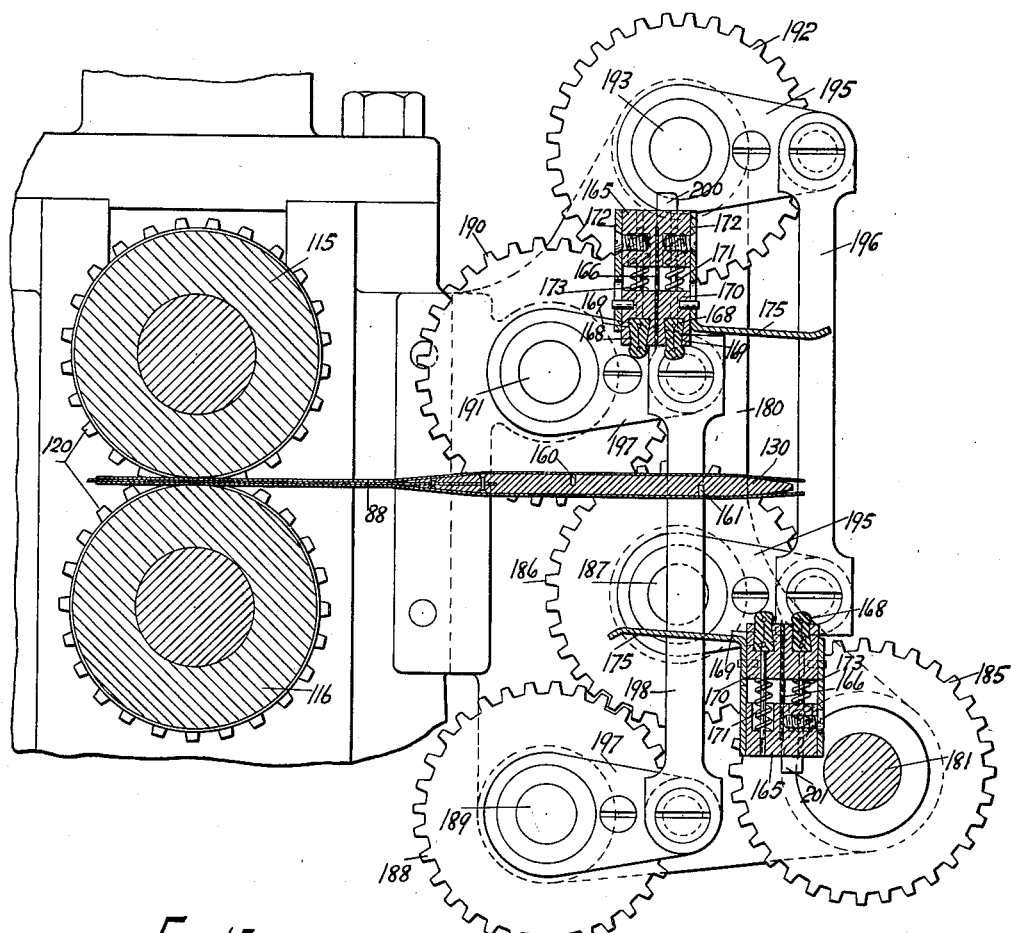
Figure 15 is a similar view showing the cutters in inactive or intermediate position.
Figure 22:
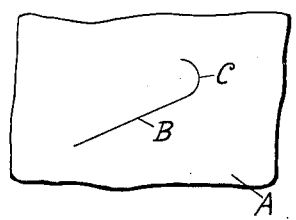

Owing to the formation of the bag, with its forwardly and rearwardly extending flaps, the cutting operations above and below the cutter head are not in register, but, in the form of the invention shown, the upper cut is spaced rearwardly of the lower cut. The head 130 is, therefore, provided with an upwardly facing groove 160 to receive the upper blade and a downwardly facing groove 161 to receive the lower cutter blade, the movements of the machine being synchronized so that each cutter enters its particular groove and remains in that groove during the forward movement of the cutter and the cutter head. This operation is performed by the mechanism shown in Figures 14 and 15.

The cutter block extends between the cutters and is supported by the simultaneous contact of the cutters on opposite sides thereof, as will be described.

The details of both cutter heads are the same. Owing to the peculiar character of the material with which we are dealing, the usual or ordinary means of cutting material cannot be used, but a special mechanism is required. Each cutter comprises cross head 165 in which is secured the knife blade 166. The cutting edge of this blade is thinner than its groove 160 or 161 and is provided with small, sharp teeth. It is necessary to hold the cellulose sheet tightly across the gap without, however, exerting any tension upon the sheet while the knife enters the material.

In order to accomplish this result, the cutter heads are provided with soft rubber pads or feet on opposite sides of the blade. These pads are shown at 168 and consist of tubes of rubber held in outwardly converging slots 169 in the surfaces of slide bars 170 mounted on opposite sides of the blade and guided by pins 171 in the cross head 165. Flanges 172 on the sides of the cutter block keep the bars in position and springs 173 urge them outwardly. When the cutter bars are spaced from the cutter head 130, the pads 168 extend beyond the knife blades, but when the bars approach the cutter head, the pads first engage the cellulose sheet on either side of the groove and the continued movement of the cutter bar presses the pads against the material so that the knives may enter while the sheet is held taut, but not under tension.

The facing flanges on the two cutter bars are provided with lateral extensions or wings 175 which bear against the cutter head 130 and support it against the force of the opposite cutter during the cutting operation.

The cutter mechanism is carried upon brackets 180 at the side of the drawing roll support, these brackets carrying a drive shaft 181 which is driven through a pinion 182 in mesh with an idler gear 183 carried upon an adjustable shaft 184 at the side of the main drive shaft. The gear 183 meshes with the gear 121 through which the cutter mechanism is driven.

As the mechanism is the same on both sides of the cutter, only one side will be described. The shaft 181 carries a drive pinion 185 which meshes with a pinion 186 on a shaft 187 in the bracket 180. The pinion 186 meshes with a lower pinion 188 on the shaft 189 and an upper pinion 190 on the shaft 191. Pinion 190 meshes with a pinion 192 on the shaft 193. It will be observed that the pinion 192 above the cutter head and the pinion 186 below the cutter head rotate in the same direction, and the pinions 188 and 190 rotate in the same direction but opposite to the pair 186—192.

The shafts 187 and 193 carry cranks 195 connected by a link 196, and the shafts 189 and 191 carry cranks 197 connected by a link 198. As the gears are driven, the links move in parallelism but in opposite directions and, at the same time, the links having a limited movement longitudinally, the forward movement of each of the links coinciding with the forward movement of the cutter head, the mechanism being so coordinated as to produce this result.

The upper cutter bar is carried upon an extension 200 of the link 198 and the lower cutter bar upon an extension 201 of the link 196.

The operation of this device will be readily understood. The knives enter the material on the cutter head 130 as the latter moves forward with the material and they continue their forward movement with the cutter head during the entire cutting operation so that the continuous movement of the material is not interferred with. In this manner the knives make the cuts E and F in the manner which has been described. It will be observed that the knives are of sufficient length to intersect the preliminary cuts and, due to the diagonal arrangement thereof, it is not necessary to extend the knives to the extreme edges of the cutter head. The diagonal cuts also compensate for the thickness of the cutter head as the said diagonal cuts extend about the edges of the head to a position where they may be intersected by the transverse knives.

*Final operations*

As each folded blank is cut off from the leading end of the web, it is supported by a plate 205 mounted upon a cross bar 206. A companion cross bar 207 is mounted above 206 and from these cross bars are extended parallel wires 208 which are received in grooves in the next two succeeding pairs of rolls.

The first pair of rolls 210 and 211 are separating rollers which travel at a slightly greater surface speed than the drawing rollers 115 and 116, to space the cut blank. This is accomplished by increasing the circumference of the rollers. The roller 210 is a steel roller and the roller 211 a rubber roller, it being found that if two steel rollers were used the pressure exerted thereby would cloud the cellulose sheet. The roller 210 is held against the latter by spring bearing members 212. The roller 210 is relieved at 213 at which point the projecting tab would otherwise be engaged, so that the separating action will be exerted upon the double thickness of the material. The roller 211 is driven by a gear 214 and spur gear 215 meshing with the gear 183. The two rollers are geared together at 216.

The next operation is to apply the gum strip G. This is done by the gum applying roller 220, which operates in conjunction with the rubber covered roller 221, the rollers being connected by intermeshing gearing 222 driven from an idler pinion 223 meshing with the gear 216 on the roller 211. The roller 220 is spring mounted at 226 and is provided with the projecting gum bar 224 held in place by a clamp bar 225. The gum bar 224 contacts with the surface of a gum transfer roll 228 on the rotation of the roller 220. The roll 228 is in contact with a gum roller 229 which rotates in a gum pot 230 on the top of the machine, an adjustable scraper 231 limiting the amount of gum to be placed upon the blank. The rollers 228 and 229 are driven by gears 233 and 234.

When not performing the gumming operation, the rollers 220 and 221 operate as feed rollers to advance the blank from the rollers 210 and 211, and for this purpose the roll 220 is provided with two enlarged portions 229 which engage the roller 221 except in the region of the gum bar. As the gum bar protrudes beyond the surface of the portions 229, it is necessary to relieve the roller 221, as at 232, to receive the gum bar.

The next operation is the creasing of the forward flap preparatory to the turning or folding operation, this operation being performed by the steel roller 235 and the rubber covered roller 236. These rollers, which also operate as feed rollers, are connected by gearing 237 and are driven from the gear 215 by a train of gearing 238. The roller 235 is pressed against the roller 236 by an adjustable bearing 240.

At the point where the forward flap enters between these rollers the roller 235 is cut away to provide a gap 241 and on the rear face of the gap is a projecting blade 242 which presses the material at the base of the flap into a sharp groove 243 in the roll 236. This serves to turn the flap upwardly as shown and to start the folding operation. When the flap is of the proper length, the creasing operation is all that is required to fold the flap over, but it may be advisable to provide a turner 245 in front of the roll 235 to complete the folding over of the flap, this operation being shown in Figure 20. The roller 235 is relieved at 246 to clear the gum strip.

The final operation is the ironing down and discharge which is performed by the steel roller 250 and the rubber covered roller 251. The rollers are connected by gearing from the roll 236 and are pressed together by the spring pressure means 252.

*Modified cutting mechanism*

The cut-off device shown in the main body of the drawings is preferred for its smoothness of operation, but modifications may be made therein. A modification of the cut-off device is shown in Figures 32 to 37. The machine is not modified from the form shown in the main body of the drawings, except as noted.

The modified form of device consists, in the main, in a cutter head which is movable with the cutter block 130. The cutter head is designated by the numeral 260 and is secured to the ends of two parallel rods 261, which are substituted for the rods 140, being guided at their rear ends in the bracket 141 and at their front ends in a bracket 262 fixed to the main frame of the machine. The cutter head is thus movable with the cutter block 130 throughout the entire operation of the machine.

The cutter head 260 is formed with a rearwardly extending portion 263 which is located beneath the cutter block 130 and at each side of the portion 263 are located vertical, parallel guideways 264 in which are movable short vertical racks 265 and 266 which face each other. The two forward racks 265 are secured together by a horizontal tie bar 267 and the rear racks by a horizontal tie bar 268. Extending through the cutter head is a rotatable shaft 270 which is cut away at 271 to clear the lower knife block to be described. Near the ends of the shaft 270 are located the segmental pinions 272, which are rotatable in the circular recesses 273 in the cutter head and which mesh with the racks 265 and 266.

At one end of the shaft 270 is located an arm 274 which is connected by a spring 275 to a bracket 276 on the cutter head, this spring tending to move the shaft to space the knife bars away from the cutter block. On the opposite end of the shaft is a pawl 278 which is located so as to engage a tooth 279 on a swinging latch plate 280 which is pivoted to the bracket 18 at 281. A tail piece 282 is formed on the latch plate which depends in the path of a pin 283 carried on the end of an arm 284 extending from the rear of the cutter head.

The cross bar 268 carries a knife block 165ᵃ similar to the knife block 165 as before described, this knife block entering the sheet of material from above. The cross bar 267 has depending therefrom, pillars 286 which carry the lower knife block 165ᵇ, entering the sheet of material from below.

The operation of this cutter mechanism may be briefly described as follows:

During the rearward travel of the cutter block and cutter head, the knife blocks are separated from the cutter block as shown in Figure 34. As the cutter head approaches the forward limit of its movement, the pawl 278 is engaged by the tooth 279 on the latch plate, and the shaft 270 is rotated by the continued movement of the cutter head, bringing the knives into cutting position as shown in Figures 35 and 36, the knives operating in the same manner as described in connection with the main portion of the specification. As the cutter head reaches its forwardmost position, the pin 283 strikes the latch plate and releases the pawl and shaft, so that the knife blocks are spaced from the cutter block by the operation of the spring 275. This completes the cycle of operation of the cutter head.

*Conclusion*

It is believed that the operation of the machine and the method will be clearly understood by the description which has been given. The operation of the various steps, both as method and apparatus, converts the strip of cellulose sheeting into a plurality of containers ready to receive the packaged goods. It will be apparent that different machines may be designed to carry out the method as outlined and that features of the machine may be used apart from the method steps.

What is claimed is:

1. Apparatus for forming bags or the like, comprising a support for a roll of material, means for slitting the material, a former, means to draw the material over the former and to wrap it around and seal it to form a tube with the slits at the edges of the former, a cutter block at the end of the former, knives on opposite sides of the block, said knives being out of register, and means for actuating the knives toward and from the block.

2. Apparatus for forming bags from a roll of material, comprising a former, means for drawing said material and wrapping it about the former to form a tube, a cutter block at the forward end of the former, means for reciprocating the cutter block, the forward movement of the cutter block coinciding with the movement of the tube, knives on opposite sides of the block, means to cause the knives to approach the block during the forward movement thereof and means to complete the severing of the tube comprising means adapted to form slits in the tube extending around the edges of the block.

3. Apparatus for forming bags from a roll of material, comprising a former, means for drawing said material and wrapping it about the former to form a tube, a cutter block at the forward end of the former, means for reciprocating the cutter block, the forward movement of the cutter block coinciding with the movement of the tube, knives on opposite sides of the block, means to cause the knives to approach the block during the forward movement thereof, movable supports for the knives, means to cause the supports to travel with the block and tube during the cutting operation and means to complete the severing of the tube comprising slitters operative on that portion of the material passing around the edges of the block.

4. A machine in accordance with claim 2 in which the knives are out of register.

5. In a machine for the uses and purposes set forth, a former, means for drawing sheet material over the former and wrapping it about the same in a tube, a cutter block on the forward end of the former, slides located in the former to support the cutter block, means connected to the slides to reciprocate the cutter block, and a knife entering the material in a straight line and movable with the cutter block at intervals to sever the leading end of the tube.

6. In a machine for the uses and purposes set forth, a former, means for drawing sheet material over the former and wrapping it about the same in a tube, a cutter block on the forward end of the former, slides located in the former to support the cutter block, means connected to the slides to reciprocate the cutter block, and a knife entering the material in a straight line and movable with the forward movement of the cutter block to sever the leading end of the tube.

7. In a machine of the type set forth, means for forming a tube of sheet material, a reciprocating cutter block, and means to cut the material on said block during forward movement of the block, said means comprising a knife, gears having movement in the same direction, a link connecting the gears and a support for said knife upon the link.

8. In a machine of the type set forth, means for forming a tube of sheet material, a reciprocating cutter block, and means to cut the tube of material on said block during forward movement of the block, said means comprising intermeshing gearing, links carried by the gearing, a knife carried by the links, and additional means for folding said material into bags.

9. In a machine of the type set forth, means for forming a tube of sheet material, a reciprocating cutter block, and means to cut a tube of material from opposite sides of the block during forward movement of the block, said means comprising intermeshing gearing, parallel links carried by the gearing, said links being movable thereby in parallelism, non-registering knives carried by said links on opposite sides of the cutter block, and additional means for folding said material into bags.

10. A machine for making bags from sheet cellulose in the web, comprising a roll support, a slitter roll over which the material passes, blades on the slitter roll to place slits in the web inwardly of the edges and on opposite sides of the center line thereof, a former, means for wrapping the web about the former and sealing the same to form a tube, means for drawing the tube over the former, a cutter block in front of the former, means for reciprocating the cutter block, knives for connecting the slits and severing the web into blanks against the cutter block, means for moving the knives with the block during the cutting operation, means for placing a strip of gum transversely of the blank, and means for folding an end of the blank over to seal the bag.

11. A machine for making bags from sheet cellulose in the web, comprising a roll support, a slitter roll over which the material passes, diagonal blades on the slitter roll to place slits in the web inwardly of the edges and on opposite sides of the center line thereof, a former, means for wrapping the web about the former and sealing the same to form a tube, the edges of the tube intersecting the slits, means for drawing the tube over the former, a cutter block in front of the former, means for reciprocating the cutter block, knives for connecting the slits and severing the web into blanks against the cutter block, means for moving the knives with the block during the cutting operation, means for placing a strip of gum transversely of the blank, and means for folding an end of the blank over to seal the bag.

12. A machine for making bags from sheet cellulose in the web, comprising a roll support, a slitter roll over which the material passes, diagonal blades on the slitter roll to place slits in the web inwardly of the edges and on opposite sides of the center line thereof, a former, means for wrapping the web about the former and sealing the same to form a tube, the edges of the tube intersecting the slits, means for drawing the tube over the former, a cutter block in front of the former, means for reciprocating the cutter block, knives for severing the web into blanks against the cutter block, said knives being located at opposite sides of the block and out of register, means for moving the knives with the block during the cutting operation, means for placing a strip of gum transversely of the blank, and means for folding an end of the blank over to seal the bag.

13. The process of forming bags or the like from a web, comprising preliminarily slitting the web by slits extending in the general direction of the web, and each slit having spaced termini extending in the opposite direction from the major portions of the slit to afford a reentrant bay, folding the web along longitudinal lines which meet the slits, and severing the material by a transverse cut which intersects the termini of the slits.

14. The process of forming bags or the like from a web, comprising the steps of preliminarily slitting the web by slits extending in the general direction of the web and having curved extensions, the termini of which extend in the opposite direction from the major portions of the slits to afford bays, folding the web along longitudinal lines which meet the major portions of the slits, and severing the web by a transverse cut which intersects the termini of the slits at one side of the bays.

15. Apparatus for forming bags or the like, comprising a support for a web of material, a former, means for slitting the material and for folding the material about the former, with the slits passing around the edges of the former, movable knives above and below the former, and means for actuating the knives to sever the material, the said knives intersecting the slits.

16. Apparatus for forming bags or the like from webs of material, means for forming spaced slits in the web, said slits having recessed portions, a former, means for longitudinally folding the web into a tube about the former with the folds intersecting the slits, movable knives on opposite sides of the former, said knives severing the tube along transverse lines intersecting the termini of the slits on opposite sides of the former.

17. Apparatus for forming bags or the like from webs of material, means for forming slits in the web, said slits having termini extending in the same direction along the web, a former, means for longitudinally folding the web into a tube about the former with the folds intersecting the slits between the termini thereof, knives on opposite sides of the former, said knives severing the tube along transverse lines intersecting the termini of the slits on opposite sides of the former.

18. The process of forming bags or the like from a web, comprising the steps of preliminarily slitting the web intermediate the edges thereof, folding the web along longitudinal lines which intersect the slits, and severing the tube into bag blanks by cuts from opposite sides thereof, each of said slits approaching and intersecting the cuts from the same direction.

19. In the formation of bags or the like from regenerated cellulose sheeting, the steps of preliminarily slitting said material by a slit extending generally in the longitudinal direction of the sheeting and having a reversely directed curved end, and severing the material by a second cut terminating at the curved end of the slit.

20. A machine for forming bags from sheet cellulose, comprising means for forming a tube from the material, a cutter block having a groove, a knife and a carrier therefor, said carrier being movable toward and from the block, yielding pads on opposite sides of the knife, said pads normally projecting beyond the knife but which retreat when pressed against the block so as to permit the knife to enter the groove and sever the material while it is held by the pads on opposite sides of the groove.

21. A machine for forming bags from sheet cellulose, comprising means for forming a tube from the material, a cutter block having a groove, a knife and a carrier therefor, said carrier being movable toward and from the block to permit the knife to enter the groove and sever the material, and means to hold the material on opposite sides of the groove, comprising yielding pads normally projecting beyond the knife but retractable when pressed against the block, to permit the knife to pass into the groove as it severs the material.

22. A machine for forming bags from sheet cellulose, comprising means for forming a tube from the material, a cutter block having a groove, a knife and a carrier therefor, said carrier being movable toward and from the block, yielding supports on the carrier and pads thereon located on opposite sides of the knife and normally projected beyond the knife but retractable to permit the knife to enter the groove while the material is held by the pads on opposite sides of the groove.

23. A machine for forming and cutting bags from a moving web of sheet cellulose, comprising means for forming a tube from the material, a cutter block movable with the material during the cutting operation and having a groove, a knife and a carrier therefor movable toward and from the block, means to move the carrier with the block during the cutting operation, yielding pads on opposite sides of the knife, said pads normally projecting beyond the knife, but which retreat when pressed against the block so as to permit the knife to enter the groove and sever the material while it is held by the pads on opposite sides of the groove.

24. A machine for forming and cutting bags from a moving web of sheet cellulose, comprising means for forming a tube from the material, a cutter block supporting the tube and movable with it during the cutting operation and having a groove, a knife and carrier therefor movable toward and from the block and also with the block during the cutting operation, movable members on the carrier, yielding pads on the members at opposite sides of the knife, said pads normally projecting beyond the knife but retractable when pressed against the block so as to expose the knife and permit it to enter the groove and sever the material while it is held by the pads on opposite sides of the groove.

LOGAN A. BECKER.
JOHN M. MUNSON.